(12) United States Patent
Hillberg et al.

(10) Patent No.: US 9,862,826 B2
(45) Date of Patent: Jan. 9, 2018

(54) HALOGEN-FREE POLYMER BLEND

(75) Inventors: Jukka Hillberg, Tampere (FI); Jukka Maki, Tampere (FI)

(73) Assignee: IONPHASE OY, Tampere (FI)

( * ) Notice: Subject to any disclaimer, the term of this patent is extended or adjusted under 35 U.S.C. 154(b) by 21 days.

(21) Appl. No.: 14/129,614

(22) PCT Filed: Jun. 28, 2012

(86) PCT No.: PCT/FI2012/050681
§ 371 (c)(1),
(2), (4) Date: Feb. 20, 2014

(87) PCT Pub. No.: WO2013/001168
PCT Pub. Date: Jan. 3, 2013

(65) Prior Publication Data
US 2014/0227542 A1    Aug. 14, 2014

(30) Foreign Application Priority Data

Jun. 30, 2011 (FI) .................................. 20115693

(51) Int. Cl.
*C08L 77/00* (2006.01)
*C08G 69/48* (2006.01)
*B32B 27/34* (2006.01)
*C08K 5/55* (2006.01)
*C08L 75/04* (2006.01)
*C08L 75/08* (2006.01)
*C08L 71/02* (2006.01)
*C08K 5/00* (2006.01)

(52) U.S. Cl.
CPC ............. *C08L 77/00* (2013.01); *B32B 27/34* (2013.01); *C08G 69/48* (2013.01); *C08K 5/55* (2013.01); *C08L 71/02* (2013.01); *C08L 75/04* (2013.01); *C08L 75/08* (2013.01); *C08K 5/0066* (2013.01); *C08K 5/0091* (2013.01); *Y10T 428/31728* (2015.04)

(58) Field of Classification Search
CPC ...... C08K 5/55; C08K 5/0066; C08K 5/0091; C08L 75/08; C08L 71/02; C08L 77/00; C08L 75/04; C08G 69/48; B32B 27/34; Y10T 428/31728
USPC ................. 428/474.7; 525/418, 92
See application file for complete search history.

(56) References Cited

U.S. PATENT DOCUMENTS

| | | |
|---|---|---|
| 5,179,168 A | 1/1993 | Hirasawa |
| 5,369,179 A | 11/1994 | Havens |
| 5,652,326 A | 7/1997 | Ueda et al. |
| 5,928,565 A | 7/1999 | Karna et al. |
| 6,149,840 A | 11/2000 | Ardakani et al. |
| 2004/0171752 A1 | 9/2004 | Nieminen |
| 2005/0064154 A1* | 3/2005 | Aylward et al. ........... 428/195.1 |
| 2005/0202320 A1* | 9/2005 | Totir et al. .................... 429/245 |
| 2009/0062497 A1 | 3/2009 | Aul et al. |
| 2009/0309075 A1* | 12/2009 | Roder .................. C08K 5/0091 |
| | | 252/519.21 |
| 2010/0059523 A1* | 3/2010 | Muhlhausen et al. ........ 220/521 |
| 2010/0255383 A1 | 10/2010 | Kofinas et al. |
| 2012/0025149 A1* | 2/2012 | Liang et al. .................. 252/506 |
| 2013/0310505 A1* | 11/2013 | Cao et al. ..................... 524/500 |

FOREIGN PATENT DOCUMENTS

| | | |
|---|---|---|
| DE | 32 42 827 A1 | 7/1983 |
| EP | 0 829 520 A1 | 3/1998 |
| EP | 0 915 506 A1 | 5/1999 |
| EP | 1 934 235 A1 | 6/2008 |
| JP | 58-15554 A | 1/1983 |
| RO | 104207 | 5/1994 |
| WO | 2007042500 A1 | 4/2007 |
| WO | 2011/123350 A1 | 10/2011 |

OTHER PUBLICATIONS

Finnish Search Report for Application Serial No. 20115693 dated Mar. 14, 2012.
International Search Report for Application Serial No. PCT/FI2012/050681 dated Dec. 10, 2012.

* cited by examiner

*Primary Examiner* — Thao T Tran
(74) *Attorney, Agent, or Firm* — McCormick, Paulding & Huber LLP

(57) ABSTRACT

The invention concerns a halogen-free polymeric blend capable of ionic conductivity comprising either one or more polyether-based polymers or copolymers that have favorable structures to facilitate polymer chain segmental motion and ion hopping environment, selected from the group of polyether-block-polymers and polyether-based polyurethanes, or said polyether based polymers or copolymers together with one or more ionomers formed by neutralization of ethylene acid co-polymers, as well as one or more specific halogen-free ionic complexes or salts comprising a weakly coordinating anion and a cation of an alkali metal or alkaline earth metal. Further, the invention concerns the use of said blend and a plastic material containing said blend as an additive.

3 Claims, No Drawings

HALOGEN-FREE POLYMER BLEND

CROSS REFERENCE TO RELATED APPLICATIONS

This application is entitled to the benefit of and incorporates by reference subject matter disclosed in International Patent Application No. PCT/FI2012/050681 filed on Jun. 28, 2012 and Finnish Patent Application No. 20115693 filed Jun. 30, 2011.

FIELD OF THE INVENTION

The present invention concerns a halogen-free static dissipative polymeric blend capable of ion conductivity, nevertheless, having the typical properties of thermoplastics.

DESCRIPTION OF RELATED ART

With increased use and manufacturing of electronics industry products the prevention of electrostatic discharges (ESD) and the control of static electricity in plastics have become increasingly important. Based on various studies it has been estimated that static electricity related events annually causes losses of over 25 billion US dollars to the electronics manufacturing industry alone. This number is increasing as the components are getting more sensitive to ESD for numerous reasons. There are also big risks in chemical and food industry bulk packaging and handling, where ESD can cause explosions of the goods during filling and discharging. There are numerous cases where human lives have been lost, because of ESD related explosions. Another application area for static dissipative polymers is dust prevention for example in consumer electronic appliances and in automotive industry, mainly in the car interior.

Electrically conductive plastics can be produced by adding finely divided conductive carbon black, conductive carbon fibers or other conductive particles to basic plastics. One of the important factors hindering the use of composites of polymers and conductive particles is the extraction of conductive particles from the material. This, for example, prevents the use of materials containing carbon black in clean room environments and in food packaging. These conductive particles or fibers have to be connected and dispersed homogenously in the polymer matrix in order to provide electrical conductivity. It is very difficult to make such composite material that would be in so called static dissipative range i.e. 1E6-1E11 ohms surface resistance (IEC61340), since the threshold level of conductivity is sharp (percolation curve). Another challenge in electrically conductive polymers is that for ESD safety the material has to always be grounded. If the ground connection is lost the material will become very unsafe.

Attempts have also been made to render plastics conductive by the use of antistatic materials, i.e. bi-polar oligomers that absorb moisture. The problems related to these materials include migration, non-permanency, high sensitivity of conductivity to relative humidity, and instabilities both during processing and in the products themselves.

There have also been attempts in manufacturing intrinsically conductive polymers (ICPs), based on, for example, polyanilines. Known electrically conductive polymers have, owing to their structure, poor mechanical properties when mixed to thermoplastics, toxicity and additionally their thermal stability is very limited.

Ion conductive polymers also known as inherently dissipative polymers (IDPs) represent a different kind of group of static control polymers. Lowered resistivity is based on ion-charge mobility in the specific polymer environment. Generally ion conductivity is a complex phenomenon and requires certain type of ion complex and polymer structure to exist. The polymer frame used consists of, for example, polyethers. A number of patents have been published in this topic area. In these, the ionic conductivity has generally been produced by the addition of a lithium salt, e.g. $LiClO_4$, to the polymer. Other possible additives include various compounds that can be ionized, such as acids.

According to U.S. Pat. No. 5,928,565, electrically conductive polymers are obtained by mixing organic sulfonic acids with polyaniline. However, such additives render the polymer blend quite dark, which limits their use.

In U.S. Pat. No. 6,149,840, in turn, it is stated that normal polymers can be rendered electrically conductive by mixing into them fluorosulfonated polyaniline in an amount of approx. 50% and by incorporating this into other polymers by means of a Lewis acid or organotitanate.

Disadvantages typical of polyelectrolytes include poor mechanical properties and poor resistance to chemicals. Furthermore, the anions and cations can extract from the materials, which limits their use, and particularly in the case of the commonly used halogens or halogenated ions causes environmental problems. Lithium ions becoming extracted causes problems in food packaging applications.

Further options include the use of an ionomer. U.S. Pat. No. 5,369,179 describes an antistatic mixture of polyether amide and a suitable blending polymer, such as an ionomer. According to U.S. Pat. No. 5,179,168, Du Pont, a blend prepared from two different ionomers can have antistatic properties by mixing large amounts of an alkali cation with an ionomer containing a large quantity of carboxylic acid groups. Absorption of water by the ionomer increases as the degree of neutralization increases, and a high degree of neutralization, for example, complicates processing.

A vast amount of ionically conductive polymer blends or compositions has been patented in the past. However, as it has been known that salts that contain chlorine or fluorine improve conductivity, halogens have formed an essential part of these compositions.

EP 0829520 (Ciba Speciality Chemicals) describes a blend containing an ionically conductive polymer, another compatible polymer, and a halogen salt i.e. sodium perchlorate. EP publication 0 613 919 A1 (U.S. Pat. No. 5,652,326), Sanyo Chemicals, further describes how an electrically conductive plastic is obtained from polyether ester amide and alkali metals when 0.01-2.00% by mass of an alkali metal halide or alkaline earth metal halide is introduced into the mixture. According to the examples, the recommended amount of metal salt is up to 5-30% by mass of the material being prepared.

US 2004171752 describes a polymer blend not utilizing any conductivity enhancing salts. Similarly, EP publication 0 915 506 A1, Tejin Ltd, discloses how there is produced from a polyester and a polyether ester amide, with an alkali metal addition of 10-2500 ppm, an electrically conductive polymer blend which additionally has 0-40% by weight of polyolefins modified with epoxy groups. The publication contains no mention of how the alkali metals or alkaline earth metals are introduced into the polymer. Further, DE application 32 42 827 A1, Ato Chimie, states that it is possible to produce from polyether ester amide and polyolefins an electrically conductive blend that is sufficiently strong and fulfills the antistatic requirements according to the so-called cigarette ash test. The publication does not contain a mention of the use of alkali metal or alkaline earth metal ions. Also, JP application publication 58 015 554, Toray Industries, describes a heat-resistant blend of a polyether ester amide and an ionomer. It is mentioned in the publication that the ionomer is prepared by adding mono-, di- or trivalent metallic ions to alpha olefin and a polymer of beta-unsaturated carboxylic acid. There is no mention of the electrical conductivity of the blend.

EP 1934235 (Chemetall), on the other hand, describes bis(oxalate)borate alkali metal complexes to be used as additives to improve, among others, conductivity. However, no ionically conductive polymers are mentioned in the application.

As halogen-containing products are known to be harmful to the environment, as well as harmful to the health of the people handling these products, it is becoming increasingly important to develop halogen-free alternatives.

Further, as many known compositions and blends absorb relatively high water content after manufacturing, then the measured conductivity originates at least partly from the conductivity of water. This means that a dry environment will cause a significant reduction in the conductivity. Thus, there is also a need for compositions and blends that provide a stable conductivity.

SUMMARY

It is an aim of the present invention to eliminate, or at least reduce the significance of the disadvantages associated with the state of the art, and to provide novel ion conductive zero halogen polymer blends.

Particularly, it is an aim of the present invention to provide polymer blends, whose ion conductivity (i.e. ionic conductivity) has been improved and stabilized using halogen-free salts.

Further, it is an aim of the invention to provide heat tolerable, recyclable polymer blends, whose ion conductivity is essentially humidity independent.

The invention is based on the idea that zero halogen salt complexes can be used to improve the ionic conductivity of polymers, particularly polymer blends. The present invention concerns such a polymeric blend capable of ionic conductivity. The selected salt renders the blend halogen-free.

More specifically, the blend of the present invention wherein one or more specific halogen-free ionic complexes or salts comprising a weakly coordinating anion and a cation of an alkali metal, whereby the weakly coordinating anion is selected from the group of boron-centered complexes where the bidentate ligand is selected from the group of C2-C8 aliphatic or aromatic organic compounds containing at least two reactive groups selected from —COOH and —OH, and whereby the cation is selected from Na and K.

Further, the use of the blend wherein it comprises the polymeric blend as an additive and the halogen-free ionically conductive plastic material comprising the blend wherein it is in the form of a single structure, wherein the blend is mixed homogeneously with one or more other polymeric or non-polymeric materials, and shaped into the desired structure, e.g. by extrusion injection molding.

Considerable advantages are obtained by means of the invention. Thus, the present invention provides a polymer blend that can be used, for example, as an additive in plastic products, and that is capable of providing the final product with properties that improve the control of static electricity. When mixing this blend with so-called basic plastics, a change is achieved in the surface resistance that is in the static dissipative range (1E6-1E11 ohm), using a surface resistance measurement according to IEC61340-2-3.

The polymer blend does not contain migrating compounds such as softeners or conventional antistatic agents, and its ion conductivity is steady. No soot-like percolation is needed in the material when the polymer blend according to the invention is blended into other polymers to form a static dissipative polymer. The material has high compatibility with numerous polymers and excellent mechanical properties.

The obtained product is halogen-free, which is a significant advantage due to the environmental values that are becoming more and more important, and due to stricter legislation. This enhances the market value of halogen-free products, as well as facilitates recyclability. The halogen-free salts utilized in the present invention are also safer to use compared to the halogen containing salts of the prior art.

Further, the products obtained using the present invention can be recycled, as they, contrary to the products currently on the market, can better withstand reprocessing, without loss of properties due to improved thermal stability.

The salts used in the present invention, in addition to being halogen-free, significantly improve the ionic conductivity of the polymers. They are used as functional components in the polymer blend, providing properties that are in optimal range for ESD protection, and maintain this property on a steady level also in varying conditions. This is because the blends of the present invention have an improved humidity independency that shows in constant static dissipative property in different environmental conditions, contrary to many known products.

It is possible to use the material according to the invention in extrusion applications, for example, to make films, sheets, fibers, pipes, hoses, coatings for numerous purposes and molded parts. It is for example suitable for the flexible and rigid packaging for electronics and chemical products packaging, floor coatings, and fiber applications. In these it is possible to exploit the good mechanical properties of the blend.

Next, the invention will be described more closely with reference to a detailed description.

DETAILED DESCRIPTION

The present invention concerns a halogen-free polymeric blend capable of ionic conduction (i.e. an ionically conductive blend) comprising either one or more polyether based polymers or copolymers that have favorable structures to facilitate polymer chain segmental motion and ion hopping environment, selected from the group of polyether-block-polymers or polyether-based polyurethanes, or said polyether based polymers or copolymers together with one or more ionomers formed by neutralization of ethylene acid co-polymers.

Examples of the polyether-block-polymers include polyether block amides, particularly made up of essentially equal portions of the polyether block and the polyamide, and polymers including a polyether block and a polyolefin block, and polymers including a polyether block and a polyester block, and polymers including a polyether block and an acrylate block.

The polyether block is preferably selected from polyethylene oxides, most suitably being polyethylene glycol.

The blend of the invention preferably contains this/these polyether based polymer(s) in an amount of 10-99% by mass, more preferably 10-80% by mass of the blend, even more preferably 25-70% by mass.

The blend includes one or more specific halogen-free ionic complexes comprising a weakly coordinating anion and an alkali metal or alkaline earth metal cation, which forms a complex that is capable of dissociation in the above mentioned polymer structure.

Said weakly coordinating anions are selected from the group of boron-centered complexes where the bidentate ligand is selected from the group of C2-C8 aliphatic or aromatic organic compounds containing at least two reactive groups selected from —COOH and —OH, or optionally from their salts.

Exemplary anions include (malonato,oxalato)borate, bis(malonato)borate, bis(oxalato)borate, (glycolato,oxalato)borate, bis(glycolato)borate, (lactato,oxalato)borate, bis(lactato)borate, (oxalato,salicylato)borate, bis(salicylato)borate, (oxalato,tartrato)borate, bis(tartrato)borate, (oxalato,catecholato)borate, bis(catecholato)borate. Preferred options are the bis-anions. Even more preferably, the mentioned weakly coordinating anion is the bis-salt of oxalic and boric acid, i.e. the bis(oxalato)borate anion. Most suitably, the cation is selected from the group of alkali metals excluding lithium, preferably including sodium, potassium, rubidium and cesium, most preferably Na and K, as among others lithium salts generally are more toxic than, for instance, Na and K salts.

In addition to the advantages mentioned above, these ionic complexes or salts have the further advantage of being inert towards the polymer types in question.

The ionic complex or salt is preferably present in an amount of 0.002-0.05 millimols/gram of the polymer blend, particularly the final blend, more preferably less than 0.03 millimols/gram of the blend, including the host polymer. With the stated amounts added, a high ionic conductivity and excellent mechanical properties are obtained simultaneously.

The term "halogen-free" is intended to mean a content of 0% added halogen. The essential components of the blend may contain traces of halogens, however, this halogen content remains below a detectable level (using conventional analytical procedures), most suitably below a content of 50 ppm.

According to a preferred embodiment of the invention, the blend comprises, in addition to the above components, as a filler polymer, a polymeric material selected from the group of polyamides, polyesters, polyacrylates, polymethyl methacrylates, polyester-based polyurethanes, as well as copolymers thereof.

Thus, according to this embodiment of the invention, the present blend contains at least two different polymers with functional groups capable of coordination (e.g. ether, ester, amide, and other carbonyl groups), of which the "first" contains at least ether groups, and of which the "second" contains at least carbonyl groups. The blend also contains a salt or ion complex that may coordinate with said functional groups, providing a more stable blend. The ratio of the first polymer to the second polymer is preferably 10:90-90:10, more preferably 30:70-90:10, most preferably 50:50-70:30.

As mentioned above, the blend possibly comprises, in addition to the first polymer and the optional second polymer, at least one ionomer, which preferably is a polymer of a co- or terpolymer of ethylene and acrylic or methacrylic acid, or any other known ionomer. The content of ionomer is preferably 1-50% by mass of the blend, more preferably 10-50% by mass, most preferably 10-30% by mass.

The final compound i.e. a mixture of said ion conductive polymer blend that forms a co-continuous network also known as interpenetrated network (IPN) within the basic host polymer, may be converted into a film, a sheet, a molded product or an injection molded product with different extrusion conversion equipment. This mixture can be formed prior to the conversion in a separate extrusion process or during the conversion process.

The melt index of the polymer blend according to the invention, measured at a temperature of 190° C. and with a weight of 2160 g, is typically 3-50 g/10 min. The melt index varies depending on the nature and properties of polymers used in the blend. The volume resistivity (ASTM D-257 or IEC60093) of the polymer blend is as low as $10^5$ ohm·m. The water absorption of the polymer blend is typically less than 10% by mass/24 hours in immersion.

The process according to the invention for preparing a static dissipative polymer blend comprises the mixing of components at an elevated temperature which is above the melting points of the polymeric components with suitable equipment such as twin screw extruder. The melt temperature is typically between 150 and 300° C. The salt is generally introduced into the blend either as is or as a mixture with other materials.

In the following, the invention will be further illustrated using examples, which are not meant to limit the scope of the invention.

As will be evidenced by the measurements below, the materials of the invention, characterized as being halogen free, show improved properties with respect to thermal stability and ionic conductivity, as well as generally polymeric compatibility, in comparison to other materials known in the art. Also the ionic conductivity is shown to be practically humidity independent giving a steady performance, a property which is of paramount importance for static dissipative materials to be used in varying ambient conditions.

Example 1

98 parts of a polyether block amide (made up of approx. 50 parts of polyethylene glycol and 50 parts of polyamide-12) and 2 parts of potassium bis-oxalatoborate were mixed together in a Werner-Pfleiderer twin-screw extruder at a temperature of 180° C. and subsequently granulated with underwater pelletizer to give polymer designated as Example 1 (abbreviated as Ex 1). The volume resistivity of the granulates, that were first dried for 3 h at 80° C. and then conditioned for 48 hours at 10 RH % and 20° C., was $1 \times 10^5$. Thermal and electrical properties for Ex 1 granulates have been collected in Table 1 and 2.

Example 2

55 parts of a polyether block amide (made up of approx. 50 parts of polyethylene glycol and 50 parts of polyamide-12), 36 parts of a glycol-modified polyethylene terephthalate, 5 parts of a styrene methyl methacrylate copolymer and 4 parts of potassium bis-oxalatoborate were mixed together in a Werner-Pfleiderer twin-screw extruder at a temperature of 220° C. and subsequently granulated with underwater pelletizer to give polymer designated as Example 2 (Ex 2). The volume resistivity of the granulates, that were first dried for 3 h at 80° C. and then conditioned for 48 hours at 10 RH % and 20° C., was $2 \times 10^5$. Thermal and electrical properties for Ex 2 granulates have been collected in Tables 1-3.

Comparative Example 1

The same procedure as described in Example 1 was used except that potassium bis-oxalatoborate was replaced by sodium perchlorate monohydrate to give polymer designated as Comparative Example 1 (abbreviated as CE 1). The volume resistivity of the granulates, that were first dried for 3 h at 80° C. and then conditioned for 48 hours at 10 RH % and 20° C., was $1\times10^5$. Thermal and electrical properties for CE 1 granulates have been collected in Table 1 and 2.

Comparative Example 2

The same procedure as described in Example 2 was used except that potassium bis-oxalatoborate was replaced by sodium perchlorate monohydrate to give polymer designated as Comparative Example 2 (CE 2). The volume resistivity of the granulates, that were first dried for 3 h at 80° C. and then conditioned for 48 hours at 10 RH % and 20° C., was $2\times10^5$. Thermal and electrical properties for CE 2 granulates have been collected in Tables 1-3.

Comparative Example 3

The same procedure as described in Example 2 was used except that potassium bis-oxalatoborate was replaced by potassium p-toluenesulphonate to give polymer designated as Comparative Example 3 (CE 3). The volume resistivity of the granulates, that were first dried for 3 h at 80° C. and then conditioned for 48 hours at 10 RH % and 20° C., was $1\times10^6$. Thermal and electrical properties for CE 3 granulates have been collected in Tables 1-3.

TABLE 1

| Example | Temp. at 1% weight loss* | Temp. at 2% weight loss* | Temp. at 5% weight loss* | MFI# |
|---|---|---|---|---|
| Ex 1 | 340 | 378 | 406 | 18.9 |
| Ex 2 | 332 | 350 | 398 | 7.7 |
| CE 1 | 317 | 337 | 362 | 25.7 |
| CE 2 | 315 | 330 | 351 | 14.0 |
| CE 3 | 380 | 392 | 407 | 6.8 |

*Temperature at depicted weight loss, measured with TGA at the rate of 10° C./min in nitrogen atmosphere;
Melt flow index measured with 2.16 kg load at 190° C.

TABLE 2

Volume resistivity of granulates soaked in water*

| Example | Original/Ωm | After 1 d/Ωm | After 2 d/Ωm | After 4 d/Ωm | After 7 d/Ωm |
|---|---|---|---|---|---|
| Ex 1 | $1\times10^5$ | $2\times10^5$ | $3\times10^5$ | $3\times10^5$ | $8\times10^5$ |
| Ex 2 | $2\times10^5$ | $3\times10^5$ | $4\times10^5$ | $3\times10^5$ | $4\times10^5$ |
| CE 1 | $1\times10^5$ | $3\times10^5$ | $3\times10^5$ | $4\times10^5$ | $4\times10^5$ |
| CE 2 | $2\times10^5$ | $4\times10^5$ | $4\times10^5$ | $4\times10^5$ | $5\times10^5$ |
| CE 3 | $1\times10^6$ | $1\times10^6$ | $1\times10^6$ | $3\times10^6$ | $4\times10^6$ |

*All samples were dried for 3 hours at 80° C. and then conditioned for 48 hours at 10RH % and 20° C. prior to measurement.

TABLE 3

Volume resistivity behavior of granulates stored first at high RH % and then at low RH %*

| Example | After 2 d at 80RH %/Ωm | After 15 min at 10RH %/Ωm | After 2 h at 10RH %/Ωm | After 6 h at 10RH %/Ωm | After 55 h at 10RH %/Ωm |
|---|---|---|---|---|---|
| Ex 2 | $9\times10^4$ | $9\times10^4$ | $1\times10^5$ | $2\times10^5$ | $3\times10^5$ |
| CE 2 | $2\times10^4$ | $2\times10^4$ | $4\times10^4$ | $6\times10^4$ | $2\times10^5$ |
| CE 3 | $8\times10^4$ | $9\times10^4$ | $2\times10^5$ | $3\times10^5$ | $9\times10^5$ |

*All measurements at 20° C.

Examples 3 and 4 and Comparative Examples 4-6

In order to evaluate the performance and properties of the dissipative materials of the invention, the materials of the examples above were converted into final products by sheet extrusion. The exemplary materials (masterbatches) were dry blended with the host polystyrene as depicted in Table 4 to give the final materials (Example Materials 3 and 4, and Comparative Example Materials 4-6). The electrical properties of the polystyrene sheets have been collected in Table 5 and 6.

TABLE 4

| | Constituents | | |
|---|---|---|---|
| Example | Masterbatch | Amount (w-%) | Polystyrene, amount (w-%) |
| Ex 3 | Ex 1 | 30 | 70 |
| Ex 4 | Ex 2 | 30 | 70 |
| CE 4 | CE 1 | 30 | 70 |
| CE 5 | CE 2 | 30 | 70 |
| CE 6 | CE 3 | 30 | 70 |

TABLE 5

Resistance behavior of sheet soaked in water*

| | Original | | | After 1 d | | | After 2 d | | |
|---|---|---|---|---|---|---|---|---|---|
| Example | SR/Ω | MD/Ω | TD/Ω | SR/Ω | MD/Ω | TD/Ω | SR/Ω | MD/Ω | TD/Ω |
| Ex 3 | $4\times10^7$ | $8\times10^7$ | $9\times10^7$ | $2\times10^{10}$ | $5\times10^{10}$ | $7\times10^{10}$ | —# | —# | —# |
| Ex 4 | $3\times10^8$ | $4\times10^8$ | $2\times10^9$ | $1\times10^9$ | $2\times10^9$ | $5\times10^9$ | $1\times10^9$ | $2\times10^9$ | $5\times10^9$ |
| CE 4 | $4\times10^7$ | $6\times10^7$ | $8\times10^7$ | $1\times10^{10}$ | $3\times10^{10}$ | $4\times10^{10}$ | —# | —# | —# |

TABLE 5-continued

| | | | | | | | | | |
|---|---|---|---|---|---|---|---|---|---|
| CE 5 | $1 \times 10^8$ | $2 \times 10^8$ | $5 \times 10^8$ | $5 \times 10^8$ | $1 \times 10^9$ | $3 \times 10^9$ | $2 \times 10^9$ | $5 \times 10^9$ | $1 \times 10^{10}$ |
| CE 6 | $2 \times 10^9$ | $4 \times 10^9$ | $2 \times 10^{10}$ | $3 \times 10^{10}$ | $6 \times 10^{10}$ | $2 \times 10^{11}$ | $6 \times 10^{10}$ | $1 \times 10^{11}$ | $4 \times 10^{11}$ |

| | After 5 d | | | After 7 d | | |
|---|---|---|---|---|---|---|
| Example | SR/Ω | MD/Ω | TD/Ω | SR/Ω | MD/Ω | TD/Ω |
| Ex 3 | $2 \times 10^{10}$ | $4 \times 10^{10}$ | $5 \times 10^{10}$ | $3 \times 10^{10}$ | $7 \times 10^{10}$ | $7 \times 10^{10}$ |
| Ex 4 | $2 \times 10^9$ | $5 \times 10^9$ | $1 \times 10^{10}$ | $5 \times 10^9$ | $7 \times 10^9$ | $2 \times 10^{10}$ |
| CE 4 | $2 \times 10^{10}$ | $4 \times 10^{10}$ | $4 \times 10^{10}$ | $4 \times 10^{10}$ | $6 \times 10^{10}$ | $8 \times 10^{10}$ |
| CE 5 | $7 \times 10^9$ | $2 \times 10^{10}$ | $5 \times 10^{10}$ | $5 \times 10^{10}$ | $1 \times 10^{11}$ | $2 \times 10^{11}$ |
| CE 6 | $8 \times 10^{10}$ | $2 \times 10^{11}$ | $4 \times 10^{11}$ | $3 \times 10^{11}$ | $5 \times 10^{11}$ | $6 \times 10^{11}$ |

*All samples were dried for 3 hours at 80° C. and then conditioned for 48 hours at 10RH % and 20° C. prior to measurement;
SR surface resistance, measured with ring probe (IEC61340-2-3);
MD resistance in machine direction, measured with bar probe (ANSI ESD D-257);
TD resistance in transverse direction, measured with bar probe (ANSI ESD D-257).
Not measured.

TABLE 6

Resistance behavior of sheet stored first at high RH % and then at low RH %*

| Example | SR/Ω | MD/Ω | TD/Ω | SR/Ω | MD/Ω | TD/Ω | SR/Ω | MD/Ω | TD/Ω |
|---|---|---|---|---|---|---|---|---|---|
| | After 2 d at 80RH % | | | After 15 min at 10RH % | | | After 1 h at 10RH % | | |
| Ex 3 | $6 \times 10^6$ | $2 \times 10^7$ | $3 \times 10^7$ | $4 \times 10^7$ | $8 \times 10^7$ | $9 \times 10^7$ | $8 \times 10^7$ | $2 \times 10^8$ | $2 \times 10^8$ |
| Ex 4 | $5 \times 10^7$ | $8 \times 10^7$ | $1 \times 10^8$ | $2 \times 10^8$ | $2 \times 10^8$ | $4 \times 10^8$ | $3 \times 10^8$ | $3 \times 10^8$ | $1 \times 10^9$ |
| CE 4 | $9 \times 10^5$ | $2 \times 10^6$ | $3 \times 10^6$ | $7 \times 10^6$ | $1 \times 10^7$ | $2 \times 10^7$ | $4 \times 10^7$ | $7 \times 10^7$ | $9 \times 10^7$ |
| CE 5 | $1 \times 10^6$ | $3 \times 10^6$ | $5 \times 10^6$ | $7 \times 10^6$ | $1 \times 10^7$ | $2 \times 10^7$ | $1 \times 10^7$ | $3 \times 10^7$ | $4 \times 10^7$ |
| CE 6 | $2 \times 10^6$ | $4 \times 10^6$ | $1 \times 10^7$ | $3 \times 10^7$ | $3 \times 10^7$ | $4 \times 10^7$ | $1 \times 10^8$ | $1 \times 10^8$ | $3 \times 10^8$ |
| | After 2 h at 10RH % | | | After 6 h at 10RH % | | | After 55 h at 10RH % | | |
| Ex 3 | $8 \times 10^7$ | $1 \times 10^8$ | $2 \times 10^8$ | $8 \times 10^7$ | $1 \times 10^8$ | $2 \times 10^8$ | $8 \times 10^7$ | $2 \times 10^8$ | $2 \times 10^8$ |
| Ex 4 | $4 \times 10^8$ | $5 \times 10^8$ | $3 \times 10^9$ | $4 \times 10^8$ | $4 \times 10^8$ | $2 \times 10^9$ | $6 \times 10^8$ | $7 \times 10^8$ | $4 \times 10^9$ |
| CE 4 | $4 \times 10^7$ | $7 \times 10^7$ | $1 \times 10^8$ | $4 \times 10^7$ | $6 \times 10^7$ | $1 \times 10^8$ | $5 \times 10^7$ | $9 \times 10^7$ | $1 \times 10^8$ |
| CE 5 | $3 \times 10^7$ | $5 \times 10^7$ | $8 \times 10^7$ | $9 \times 10^7$ | $1 \times 10^8$ | $3 \times 10^8$ | $2 \times 10^8$ | $2 \times 10^8$ | $6 \times 10^8$ |
| CE 6 | $4 \times 10^8$ | $4 \times 10^8$ | $2 \times 10^9$ | $9 \times 10^8$ | $7 \times 10^8$ | $5 \times 10^9$ | $2 \times 10^9$ | $1 \times 10^9$ | $1 \times 10^{10}$ |

*All measurements at 20° C.;
SR surface resistance, measured with ring probe (IEC61340-2-3);
MD resistance in machine direction, measured with bar probe (ANSI ESD D-257);
TD resistance in transverse direction, measured with bar probe (ANSI ESD D-257).

The electrical conductivity of the polymer blend according to the invention can be improved further, for example, with commercial antistatic compounds, softeners or other small-molecular hygroscopic compounds.

While the present invention has been illustrated and described with respect to a particular embodiment thereof, it should be appreciated by those of ordinary skill in the art that various modifications to this invention may be made without departing from the spirit and scope of the present invention.

What is claimed is:

1. An extrudable halogen-free polymeric blend capable of humidity independent ionic charge conduction which consists of a polyether-polyamide block copolymer and an ionic complex or salt selected from sodium bis(oxalato)borate and potassium bis(oxalato)borate and wherein the ionic complex is present in the polymeric blend in an amount of 0.002-0.05 millimols/gram of the polymeric blend.

2. The polymeric blend according to claim 1 wherein the ionic complex or salt is potassium bis(oxalate)borate.

3. An extrudable halogen-free polymeric blend capable of humidity independent ionic charge conduction which consists of a polyether-polyamide block copolymer, 10-30% by mass of one or more ionomers formed by neutralization of polymers of a co- or terpolymer of ethylene and acrylic or methacrylic acid, and an ionic complex or salt selected from sodium bis(oxalato)borate and potassium bis(oxalato)borate, wherein the ionic complex or salt is present in the polymeric blend in an amount of 0.002-0.05 millimols/gram of the polymeric blend.

* * * * *